United States Patent [19]

Mori

[11] Patent Number: 4,512,335
[45] Date of Patent: Apr. 23, 1985

[54] SOLAR ENERGY COLLECTING APPARATUS

[76] Inventor: Kei Mori, No. 3-16-3-501,, Kaminoge, Setagaya-ku, Tokyo, Japan

[21] Appl. No.: 482,027

[22] Filed: Apr. 4, 1983

[30] Foreign Application Priority Data

Apr. 3, 1982 [JP] Japan .................... 57-55668
Apr. 5, 1982 [JP] Japan .................... 57-56215

[51] Int. Cl.³ .............................................. F24J 3/02
[52] U.S. Cl. ..................................... 126/440; 126/424; 126/443; 350/96.23
[58] Field of Search ............... 126/417, 424, 425, 440, 126/443, 451; 350/96.10, 96.23, 96.24

[56] References Cited

U.S. PATENT DOCUMENTS

| | | | |
|---|---|---|---|
| 4,026,267 | 5/1977 | Coleman | 126/440 X |
| 4,156,420 | 5/1979 | Gunderson | 126/433 X |
| 4,201,197 | 5/1980 | Dismer | 126/451 |
| 4,223,174 | 9/1980 | Moeller | 126/425 X |
| 4,257,401 | 3/1981 | Daniels | 126/439 |
| 4,307,711 | 12/1981 | Doundovlakis | 126/440 X |
| 4,307,936 | 12/1981 | Ochiai | 126/417 X |

FOREIGN PATENT DOCUMENTS

14150 1/1982 Japan ...................... 126/424

*Primary Examiner*—Margaret A. Focarino
*Attorney, Agent, or Firm*—Cantor and Lessler

[57] ABSTRACT

A solar energy collecting apparatus comprising a capsule being made of a transparent material, plurality of lenses capsulated in said transparent capsule and collect sunbeams, a sunbeam collecting means and heat collecting means deposited at the focal point of the lens, a photo-conductive cable which transmits the sunbeam collected by said sunbeam collecting means to the desired place and a heat transmitting pipe which transmits solar heat collected by said heat collecting means to the desired place.

12 Claims, 15 Drawing Figures

SOLAR ENERGY COLLECTING APPARATUS

SUMMARY OF THE INVENTION

The present invention relates to a solar energy collecting apparatus comprising a capsule made of a transparent material, a plurality of lenses capsulated in said transparent capsule to collect the sun's rays, a sunlight collecting means and a heat collecting means deposited at the focal point of the lens, a photoconductive cable which transmits the sunlight collected by said sunlight collecting means to the desired place and a heat transmitting pipe which transmits solar heat collected by said heat collecting means to the desired place.

BACKGROUND OF THE INVENTION

With the advent of the energy saving era, possible effort is directed recently particularly to research and development for effective use of solar energy. For the most effective use of solar energy, it is a must to directly use the solar energy as the light energy, namely to use the solar energy without converting it to another form of energy such as heat energy and electrical energy. From this point of view, the applicant of the present invention has proposed various kinds of solar collecting apparatuses where the solar energy is converged using lenses etc. and then guided into a photo-conductor, thereafter transmitted through said photo-conductor to the place requiring the lighting and thereby such solar energy is used for indoor lighting etc. The present invention is also proposed as a part of such apparatuses and particularly an apparatus where a means for converting the solar energy to heat energy is effectively employed into the aforementioned sunlight collecting apparatus, and thereby both light energy and heat energy of the sun can be used simultaneously only with a single apparatus.

OBJECT OF THE INVENTION

It is an object of the present invention to provide an apparatus for effectively utilizing solar energy by comprising the means for collecting effectively light energy and heat energy of the sun into the transparent capsule.

BRIEF DESCRIPTION OF THE DRAWINGS

FIG. 4 and FIG. 5 are schematic diagrams of structure for explaining another embodiment of the present invention.

DETAILED DESCRIPTION OF THE INVENTION

Figure 1:
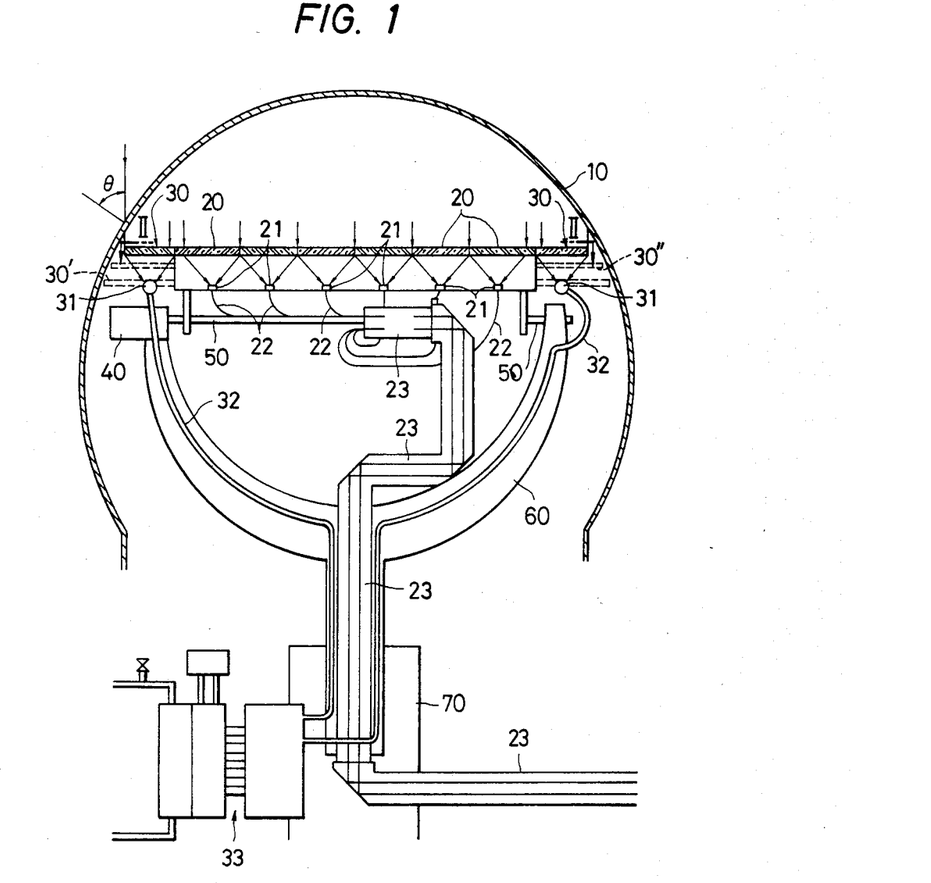
FIG. 1 is a schematic side elevation of the main part for explaining an embodiment of the solar energy collecting apparatus to which the present invention is applied.
Figure 2:
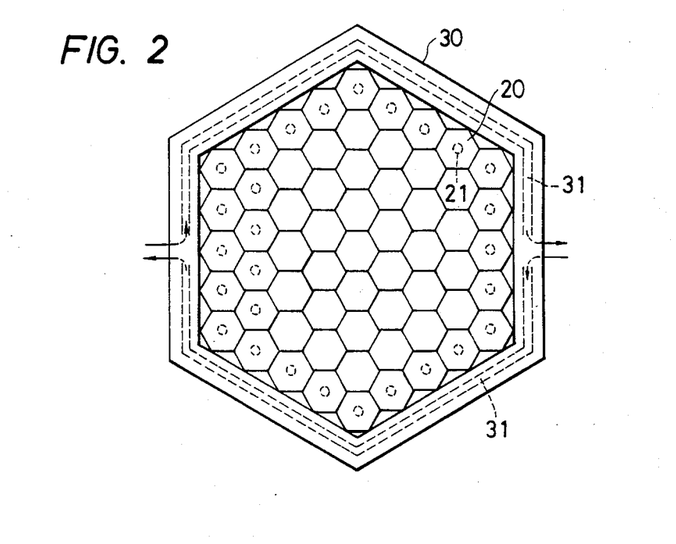
FIG. 2 is a plan view of FIG. 1 viewed along the line II—II.

FIG. 1 is a schematic diagram of a side elevation of the main part for explaining an embodiment of a solar energy collecting apparatus of the present invention, in other words, of the beam collecting and heat collecting apparatus, and FIG. 2 is a plan view of FIG. 1 viewed along the line II—II. In these figures, 10 is a transparent capsule; 20 is a circular, square or hexagon (FIG. 2 shows hexagon shape lenses) lens having the desired shape; 30 is a linear Fresnel lens. The lens 20 converges the sun's rays and focuses the beam spot, and the beam collecting means 21 is provided at said focal point, while the linear lens 30 converges the sun's rays and focuses the beam in the form of a line and the heat collecting means 31 like a heat pipe is disposed along such focal line. The solar energy collected by the beam collecting means 21 is guided into the photo-conductive pipe 23 via the photo-conductive cable 22 and then transmitted to the desired place via said photo-conductive pipe 23 for utilization in lighting or others. Meanwhile, the heat energy collected by the heat collecting means 31 is transmited to the heat exchanger 33 via the heat transmitting pipe 32 such as a heat pipe and is used as the heat source in said heat exchanger 33.

Figure 3:
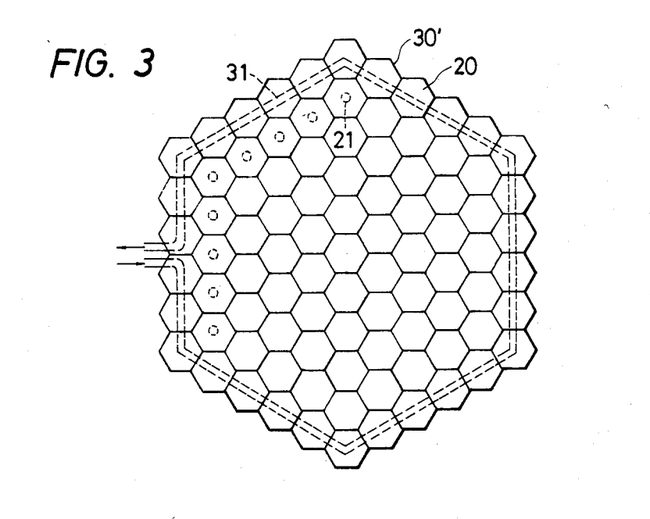
FIG. 3 is a plan view of the main portion indicating another embodiment of the present invention.

Here, said solar energy collecting apparatus provides a solar direction detecting system, not illustrated, which controls said lens system in such a way as always directing it to the sun in order to most effectively collect the solar energy. For this object, the lens assembly consisting of the lens systems 20 and 30 is supported by the motor 40 freely rotably around the shaft 50; these lens assembly, motor 40 and rotating shaft 50 are supported by the supporting arm 60 in such a manner as freely rotatable around the rotating shaft 70 crossing said rotating shaft 50 at a right angle. Thereby, the lens assembly is now capable of tracking automatically the movement of the sun. The applicant of the present invention has already proposed various kinds of apparatuses concerning a solar energy collecting appratus wherein the lens system is housed within the capsule and said lens assembly is capable of tracking automatically the direction of the sun. However, in case the lens system is accommodated in the capsule, the sunbeam direction is disturbed when it passes said capsule, particularly the sunbeam entering the peripheral part of the lens assembly is reflected by said capsule because the incident angle $\theta$ to the capsule 10 is too large. Therefore, the light having a spectrum different from that of sunlight enters the peripheral lens. Accordingly, if it is attempted to directly use the sunlight converged by the peripheral lens as photo-energy, such sunlight has a wavelength different from that of the sunlight. Therefore, the existing sunlight collecting apparatus leaves the space for this lens system 30 idle. But this idle space becomes very wide when it is totalized because such space corresponds to the peripheral part of the lens assembly and it has resulted in reduction of accommodataion efficiency of lens system to the size of capsule or application efficiency of the sunbeam energy. The present invention has been proposed, with the abovementioned background, in mind to effectively utilizing such idle space. Namely, as explained above, the lens for collecting heat energy is provided to the peripheral part of the lens assembly for light collecting which has been the idle space in the existing apparatus. When the sunlight collected by such lens is used after conversion into the heat energy, differences in the quality of sunlight, due to differences in wavelength components of sunlight, is completely eliminated and the solar energy can be more effectively utilized. The heat energy thus collected is guided to the heat exchanger 33 and is used for well-known various objects. In addition to such use, for example, it is also possible to heat the air within the capsule during the night in order to prevent dew condensation on the lens system and other devices within the capsule. FIG. 2 shows an example where the line focal point type linear Fresnel lens is used as the lens 30 for collecting heat energy. However, the present invention is not limited only to the above embodiment. For example, as shown in FIG. 3, it is also possible to form every lens of the point focus type lens arranged concentrically (concentrical hexagon shape in the case of FIG. 3) and to use a single line or several lines of the peripherally arranged lenses as the lenses 30' for heat collection. Moreover it is not always required to form the heat energy collecting lens 30 and beam energy collecting lens 20 in the same plane as shown in FIG. 1. For example, as shown by the dotted lines 30'' and 30''' in FIG. 1, only the heat energy collecting lens can be provided at the center of capsule. Thereby, the idle space of the capsule can be used more effectively.

Figure 4:
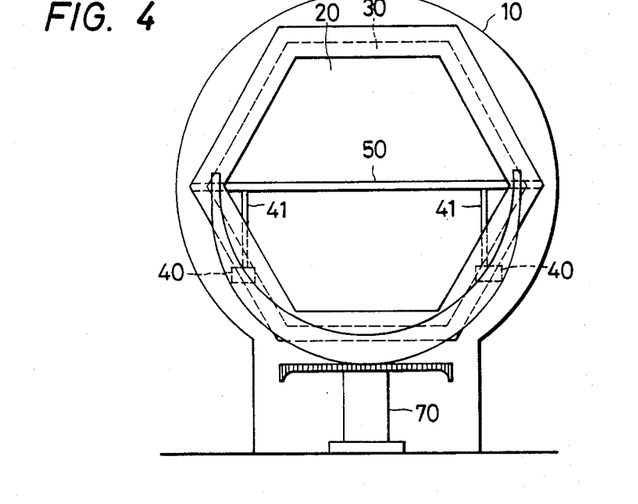
FIG. 4 is a front elevation.
Figure 5:
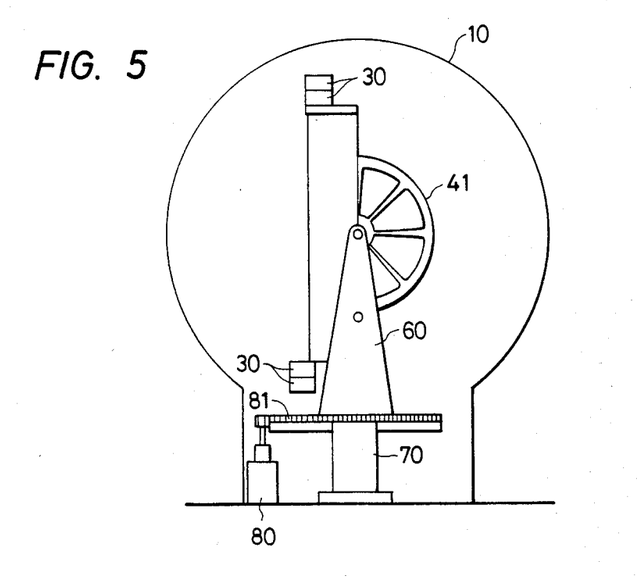
FIG. 5 is a side elevation.

FIG. 4 is a schematic diagram of a front elevation of another embodiment where said lens assembly is formed in such a way as to automatically track the movement of the sun. FIG. 5 is a side elevation. In the case of this embodiment, the motor 40 is mounted to the supporting arm 60. Rotation of said motor 40 is transmitted to the rotating shaft 50 via the gear 41. Meanwhile, rotation of motor 80 is transmitted to the rotating shaft 70 via the gear 81. The motors 40 and 80 are so controlled by the detecting signal sent from the sun's direction detecting apparatus(not illustrated)mounted integrally to the lens assembly whose sun beam receiving surface always faces to the sun.

Figure 6:
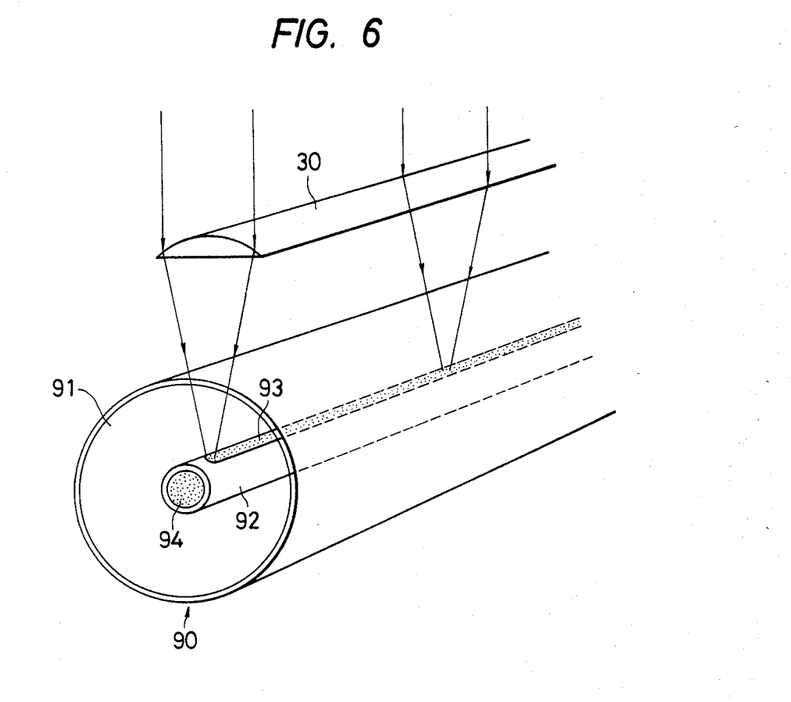
FIG. 6 and FIG. 7 are outlines of structure of main portions indicating respectively examples of heat transmitting pipe just suitable for use in the embodiment of the present invention.

In the above explanation, a heat pipe is used as the heat transmitting pipe, but the present invention is not limited to above embodiment. For example, it is also possible to use a heat transmitting pipe as shown in FIG. 6. Namely, in FIG. 6, 30 is a line focal point type linear Fresnel lens for heat energy collection (spot focal point type lens may also be used). 90 is a heat transmitting pipe arranged in such a way as to pass the focal line of the lens 30. The heat transmitting pipe 90 is composed, for example, of a transparent hollow pipe 91, a heat transmitting pipe 92 which is arranged coaxially with said pipe 91 in it and the black colored material 93 is provided on the area corresponding to the focal point of said lens system 30 in said heat transmitting pipe 92 for effective heat absorption. In addition, said heat transmitting pipe 92 is filled with a fluid heat storing material 94. This heat storing material 94 is forcibly moved within said heat transmitting pipe 92 with a pressure applying means not illustrated and circulates in the route including the heat exchanger. Therefore, the sunbeam converged by the lens system 30 is effectively converted into heat energy by the black colored material 93 and is transmitted to the heat storing material 94 within the heat transmitting pipe 92. Said heat storing material 94 is carried to the heat exchanger by means of the pressure applying means. The heat carried is used as various kinds of heat sources in said heat exchanger. The present invention can be attained effectively by using such a heat transmitting pipe. In case the hollow pipe 92 is evacuated or is filled with an inert gas, heat radiation from the heat transmitting pipe 92 can be reduced.

Figure 7:
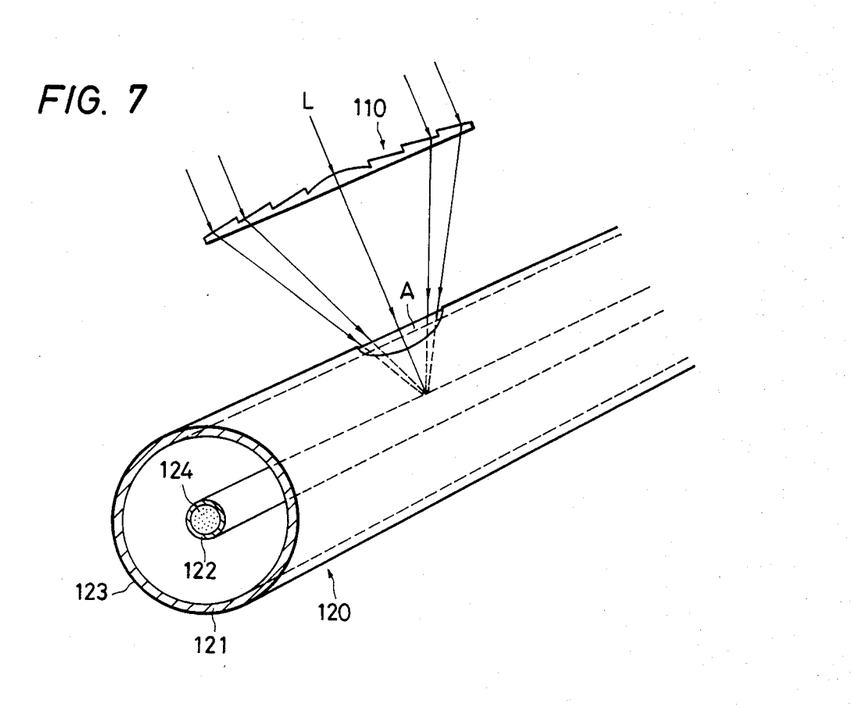
Figure 8:
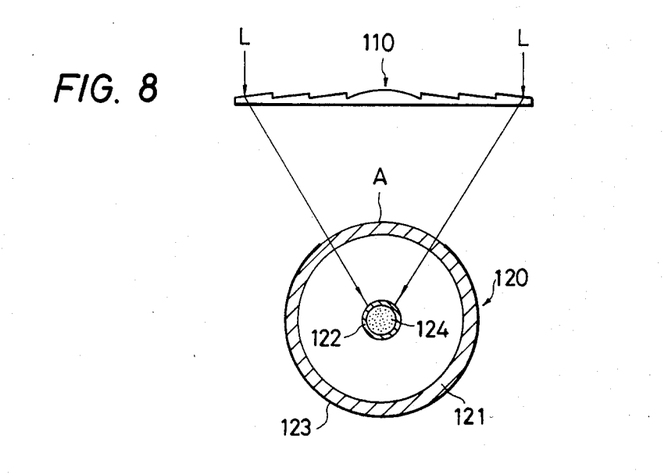
FIG. 8 is a transverse cross section of FIG. 7.

FIG. 7 is a partial perspective view for explaining another example of the heat transmiting pipe. FIG. 8 is a transverse cross-section of it. In this figure, 110 is a lens system such as the Fresnel lens etc. for focusing the solar energy L; 120 is a heat transmission apparatus which converts the solar energy converged by the lens system 110 into the heat energy and then transmits it to the desired place. Said heat transmission apparatus 120 is composed of a hollow pipe 121 and the heat transmission pipe 122 which is arranged within said hollow pipe 121 almost coaxial to said hollow pipe 121. In such composition, a heat transmission pipe 122 is provided in such a way as to pass almost the focal point of the lens system 110. Here, the hollow pipe 121 is formed transparent in its entire part or in part as shown in the figure thereby the sunbeam converged by the lens system 110 can be transmitted into the pipe through said transparent portion A, with the other part being coated with the mirror-finished reflection film 123. Therefore, the sumbeam L converged by the lens system 110 reaches the heat transmission pipe 122 through the transparent hollow pipe 121 or the transparent part A of hollow pipe 121 and is converted into the heat energy by said heat transmission pipe 122. Here, said heat transmission pipe 122 is filled with a fluid heat storing material 124, which is forcibly moved within said heat transmission pipe 122 by a certain pressure-applying means not illustrated and transmitted to a heat exchanger for use therein as the heat source for various purpose.

Figure 9:
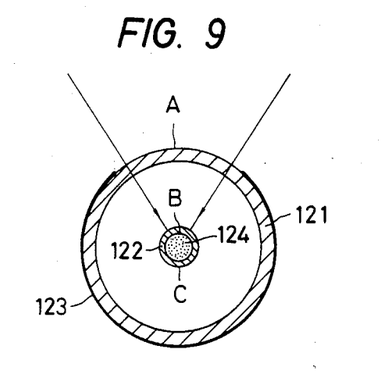
FIG. 9 is a transverse cross section of main portion for explaining a modified embodiment.

The heat storing material 124 which is cooled after such heat exchange in said heat exchanger circulates in the heat transmission pipe 122 and returns to the focal point of lens system 110. As explained above such heat storing material 124 is heated again and then transmitted again to the heat exchanger. This cycle is repeated continuously. According to the present invention, as explained above, the heat storing material within the heat transmission pipe is heated by the solar energy converged through the lens system and is sent to the heat exchanger for use as the heat source, thereafter said cooled heat storing material is circulated again to the focal point of said lens system. Namely, such concept as providing the heat transmission pipe at the focal point of lens system allows to make larger the diameter of heat transmission pipe than that of the solar image formed by the lens system, thereby it is now possible to effectively convert, even if the focal point of lens system is more or less deviated, the solar energy into heat energy and to transmit it to the heat storing material within the heat transmitting pipe. Preferably, the solar energy converged by the lens system can be more effectively utilized as the heat energy by forming said heat transmitting pipe 122 with a black-colored material. In other words, heat radiation from the heat transmitting pipe 122 can be reduced as much as possible and the solar energy having reached said heat transmitting pipe can be transmitted to the heat storing material after more effectively converted into heat energy. Moreover, in case the hollow pipe 121 is partly transparent, namely, the area A allowing the sunbeam converged by the lens system 110 to pass is transparent and another part is formed with the mirror-finished reflection film 123 as shown in the figure, the solar energy converged by the lens system is more effectively converted into the heat energy because the heat radiated from heat transmission pipe 122 is reflected by said reflection film 123 and back to the heat transmission pipe 122. Furthermore, as shown in FIG. 9, when only a part of heat transmitting pipe 122, namely the area B equivalent to the focal point of the lens system 110 is formed with the black-colored material and other part C is mirror-finished, thermal radiation from the mirror-finished part under a high temperature condition is less than that from the black-colored portion B and therefore the solar energy converged by the lens system is more effectively converted into heat energy. In case the transparent area A of hollow pipe 121 and the black-colored area B of heat transmitting pipe 122 are formed slightly wider than the area through which the peripheral part of the sunbeam flux converged by the leans system passes, the solar energy is converted effectively even if the focal point of the lens system is deviated, and in addition any irregular beam converged by the peripheral part of lens system (the sunbeam converged by the peripheral part of the lens has a different focal point in each wavelength due to chromatic aberation) can also be effectively converted into heat energy. Further, in case the inside of hollow pipe 120 is evacuated or filled with an inert gas, heat radiation can be suppressed, and thereby the solar energy can be used effectively as heat energy.

Figure 10:
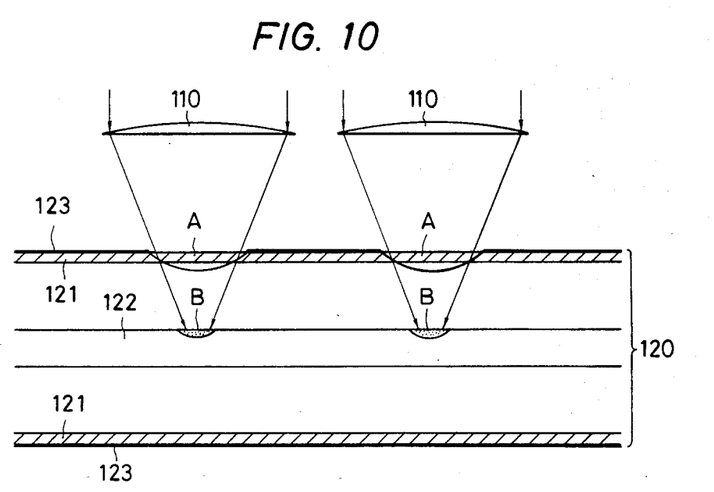
FIG. 10 and FIG. 11 are sectional side elevations of main portions for explaining other embodiment of the present invention.
Figure 11:
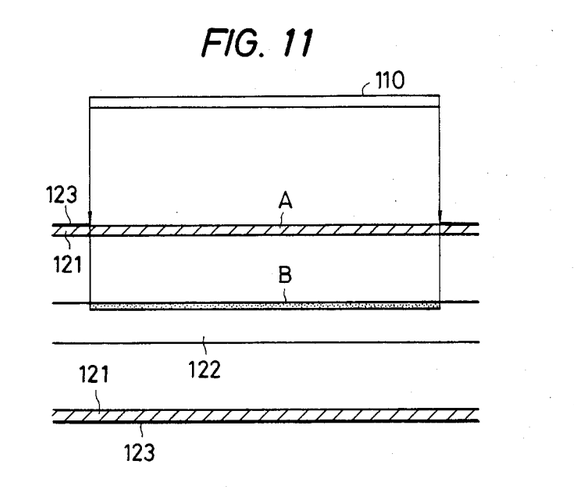
Figure 12:
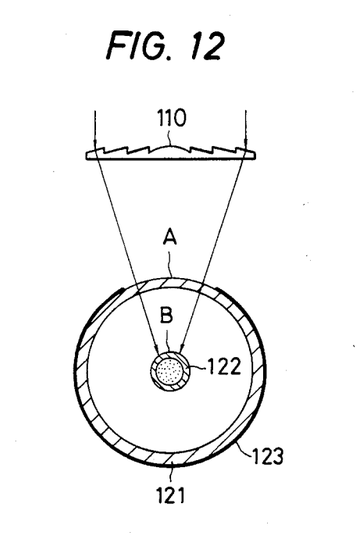
FIG. 12 is a transverse cross section of FIG. 11.

FIG. 10 is a sectional side elevation of the main part indicating an embodiment wherein a plurality of point focus type lens systems 110 as explained above are used and said heat transmitting apparatus 120 passes the focal point of each lens system. FIG. 11 is a sectional side elevation of the main part of such embodiment where the line focus type linear Fresnel lens is used as said lens system 110. FIG. 12 is a transverse cross-section of FIG. 11, wherein the solar energy can effectively be converted into heat energy, as shown in the figure, by using plurality of point focus type Fresnel lenses, providing the heat transmitting apparatus in such a way as to pass the focal point of respective lens, or providing the linear Fresnel lens in parallel to the heat transmitting apparatus which is set along the focal point of said linear Fresnel lens.

Figure 13:
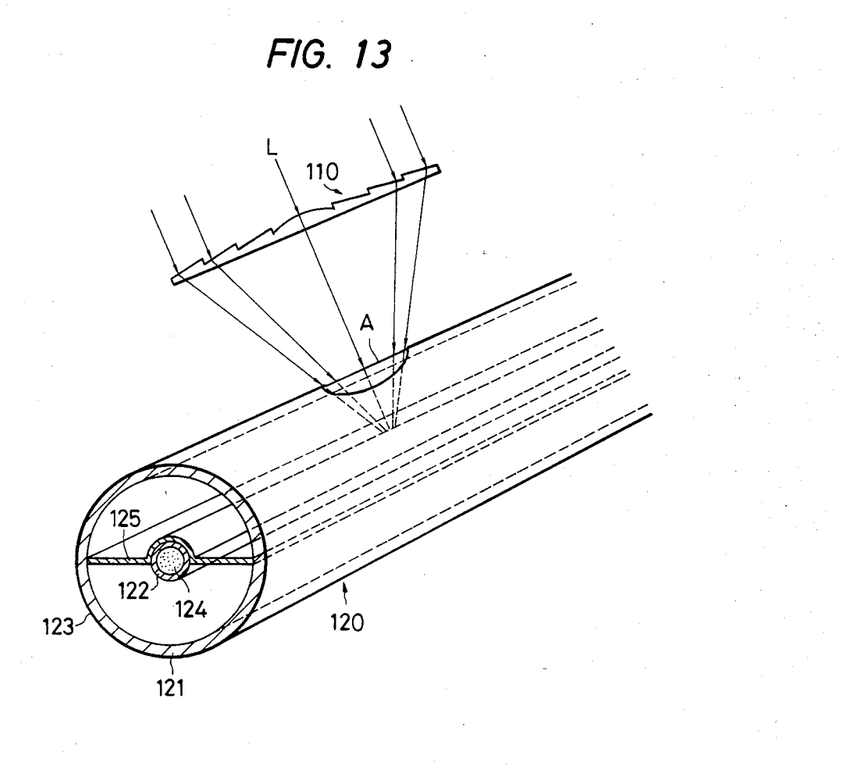
FIG. 13 is a perspective view of main portion for explaining further embodiment of the present invention.
Figure 14:
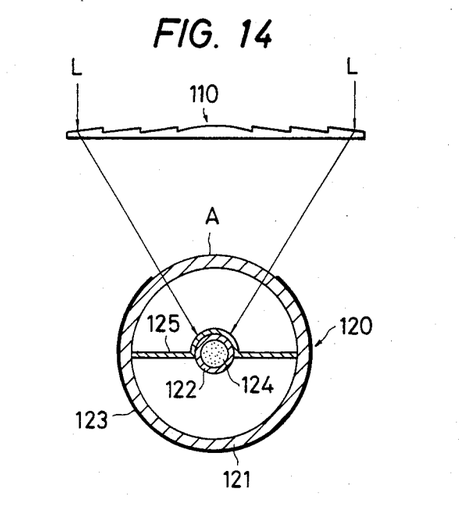
FIG. 14 is a transverse cross section of FIG. 13.
Figure 15:
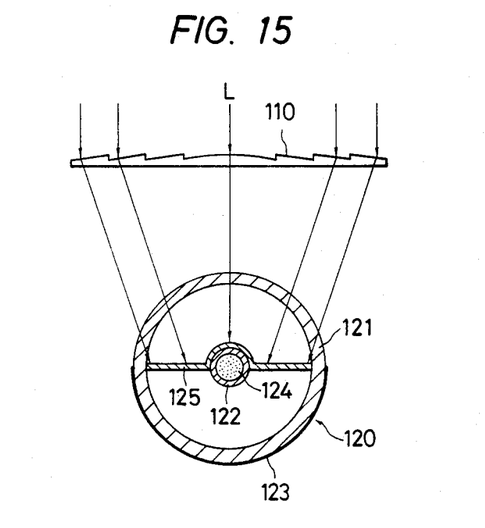
FIG. 15 is a transverse cross section where a linear Fresnel lens is used.

FIG. 13 is a perspective view of the essence of another embodiment of the present invention. FIG. 14 is a transverse cross-section of it. In the case of this embodiment, as shown in the figure, the heat conductive shielding plate 125 is provided to the aformentioned heat transmitting pipe 122 in such a manner as to cover almost a half of said heat transmitting pipe 122 and divide said hollow pipe 121 into two portions in the radius direction. Thereby, the sunbeam energy converged by the lens system 110 is converted into the heat energy by said heat conductive shielding plate 125 and then transmitted to the heat transmitting pipe 122 in the form of heat energy. Accordingly, the sunbeam energy can effectively converted into the heat energy and then transmitted even if the heat transmitting pipe 122 is slightly deviated from the focal point of lens system 110. It can easily be understood that it is not always necessary to provide said heat conductive shielding plate 125 to the entire part in the hollow pipe but only to the area corresponding to the focal point of lens system. Moreover, in case the linear Fresnel lens is used, as shown in FIG. 15, it is possible to have the focal points of lens system 110 spread over the entire part of said heat conductive shielding plate 125.

As is obvious from the above explanation, according to the present invention, the sunbeam energy collecting lens and solar heat energy collecting means are effectively accommodated within the capsule and therefore add a solar energy collecting apparatus to increased accommodation efficiency of capsule making it applicable for multi-purpose use.

What is claimed is:

1. A solar energy collecting apparatus comprising a transparent capsule; a lens assembly comprising a plurality of spot focal point type lenses housed in said capsule and arranged essentially concentrically in order to converge rays of the sun; a sunlight collecting means and solar heat collecting means which are integrated into said lens assembly and provided at the focal point of said lens; a photo conductive cable for transmitting sunlight collected by sunlight collecting means to the desired place; and a heat transmitting device for transmitting the solar heat collected by said heat collecting means to the desired place, said heat collecting means being provided for at least one line of the peripheral side of said lens assembly, and said sunlight collecting means being provided for the remaining lenses at the central portion.

2. A solar energy collecting apparatus according to claim 1 characterized in that a plurality of spot focal point type lenses are provided along said heat transmitting device.

3. A solar energy collecting apparatus according to claim 1 characterized in that the lens for collecting sunlight is of the spot focal point type lens and the lens for collecting solar heat is of the line focal point type lens.

4. A solar energy collecting apparatus according to claim 3 characterized in that a concentric hexagon is formed using a plurality of spot focal point type lenses in order to collect sunlight and a line focal point type lens for collecting solar heat provided in parallel to said hexagon along its periphery.

5. A solar energy collecting apparatus according to claim 1, 3, or 4 characterized in that said heat transmitting device comprises a hollow pipe and a heat transmitting pipe which is disposed within and coaxially with said hollow pipe and is filled with a fluid heat storing material, said hollow pipe is formed with a transparent material, and said heat transmitting pipe is formed with a black-colored material.

6. A solar energy collecting apparatus according to claim 5 characterized in that the portion of said heat transmitting pipe corresponding to the focal point of said lens system is formed with a black colored material and the remainder is mirror-finished.

7. A solar energy collecting apparatus according to claim 5 characterized in that only a portion of said hollow pipe through which the sunbeam converged by said lens system passes is formed with a transparent material and the other portion is mirror-finished.

8. A solar energy collecting apparatus according to claim 5 characterized in that the inside of said hollow pipe is evacuated.

9. A solar energy collecting apparatus according to claim 5 characterized in that the inside of said hollow pipe is filled with an inert gas.

10. A solar energy collecting apparatus according to claim 5 further comprising line focal point type linear lenses along said heat transmitting device.

11. A solar energy collecting apparatus according to claim 5 characterized in that a heat conductive shielding plate covers essentially half of said heat transmitting pipe and divides said hollow pipe into two sections in the radius direction.

12. A solar energy collecting apparatus according to claim 11 characterized in that said heat conductive shielding plate is provided only at the area near the focal point of said lens system.

* * * * *